Patented Nov. 29, 1949

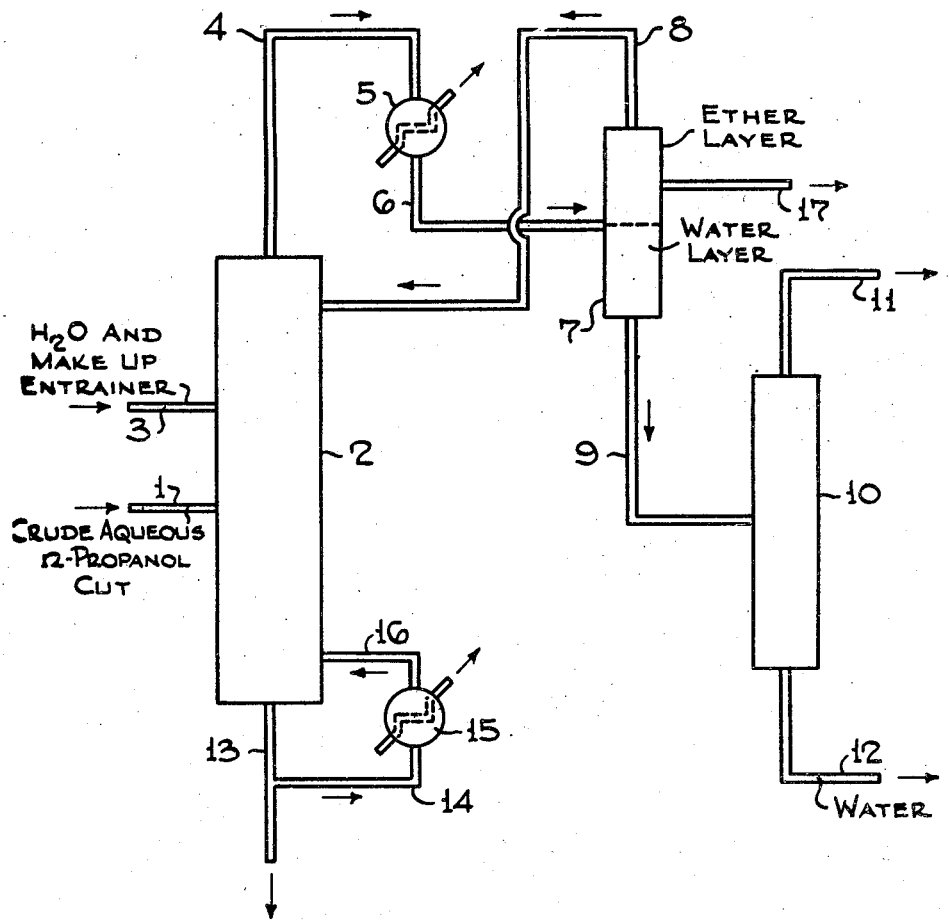

2,489,619

UNITED STATES PATENT OFFICE 2,489,619

RECOVERY OF NORMAL PROPYL ALCOHOL FROM OXYGENATED COMPOUNDS

Carl S. Carlson, Elizabeth, N. J., Nat C. Robertson, Corpus Christi, Tex., and Carter E. Porter, Cranford, N. J., assignors to Standard Oil Development Company, a corporation of Delaware Application August 23, 1948, Serial No. 45,724

17 Claims. (Cl. 202—42)

This invention relates to the purification of n-propyl alcohol, and particularly, to the purification of an aqueous n-propyl alcohol fraction which is contaminated with other close-boiling oxygenated compounds, such as other alcohols, esters, aldehydes and ketones.

The drawing shows diagrammatically a train of apparatus for carrying out my process.

Numerous processes are known in which an aqueous solution of a mixture of oxygenated compounds are produced. Typical of these processes are the well-known Fischer synthesis, wherein hydrocarbons and oxygenated compounds are produced by the reaction between oxides of carbon and hydrogen in the presence of catalyst; the numerous processes employed for the oxidation and partial oxidation of petroleum hydrocarbons, particularly the lower aliphatic hydrocarbons; and the so-called "oxo" process, wherein olefins are reacted with carbon monoxide and hydrogen in the presence of a catalyst.

A typical mixture consisting substantially of n-propyl alcohol, which is to be purified according to the terms of this invention, has the following composition.

| Component | Amount |
|---|---|
| | Wt. Percent |
| Aldehydes | 2-6 |
| Esters | 0.2-3 |
| Water | 28-29 |
| Alcohols (principally n-propyl) | 62-69.8 |
| Ketones | Trace |

The alcohols involved included on an alcohol basis, analyzed as follows:

Volume per cent
n-Propanol _____ 90
i-Propanol _____ 6
Sec. BuOH _____ 2
Ethanol _____ 2
i-BuOH _____ Trace The above analysis is typical of the so-called "n-propyl cut" obtained from the water-soluble neutral products of the Fischer synthesis. Such a cut has a boiling range of 78.3° C. to 124° C., on an anhydrous basis, and a boiling range of 78.1° C. to 92.3° C., on a wet basis.

The following compounds are included among those found in the "n-propyl cut." The compounds are listed with their boiling points and the boiling points of their aqueous azeotropes:

| Compound | Boiling Point (dry), °C. | Boiling Point ($H_2O$-Azeotrope), °C. |
|---|---|---|
| Ethyl Alcohol | 78.3 | 78.1 |
| Isopropyl Alcohol | 82.4 | 80.2 |
| n-propyl Alcohol | 97.2 | 87.7 |
| Ethyl Propionate | 99.1 | 81.2 |
| Sec-Butyl Alcohol | 99.5 | 87.7 |
| n-propyl Acetate | 101.6 | 82.4 |
| t-amyl Alcohol | 102.4 | 87.2 |
| Isobutyl Alcohol | 108.1 | 89.8 |
| sec-Butyl acetate | 112.0 | 87. |
| Isobutyl Acetate | 117.2 | 87.4 |
| n-butyl Alcohol | 118. | 92.3 |
| Ethyl Butyrate | 121.6 | 87.9 |
| Paraldehyde | 124 | 90.4 |

It will be seen from the above range of boiling points that the separation of an aqueous mixture of the above materials or any number of them by fractional distillation, would be a very difficult procedure, demanding highly efficient fractionation. The presence of water during fractional distillation is conducive to the formation of the binary aqueous azeotropes which boil so closely that separation is practically impossible on an economic basis.

This invention provides a means whereby n-propyl alcohol can be substantially freed from other close-boiling components by distillation, by the creation of other azeotropes in the system which make the separation easier as a result of the increase in boiling point spread between the azeotropes so produced and the azeotrope of n-propyl alcohol.

According to the terms of this invention an aqueous "n-propyl cut" is purified by an azeotropic distillation process wherein the harmful close-boiling impurities are removed overhead by an aliphatic ether entrainer. The aliphatic ether employed according to the terms of this invention is one boiling between 55° C. and 110° C., but preferably an aliphatic ether boiling in the range of 55° C. to 70 C.

The following ethers are suitable:

Boiling point ° C.
Diisopropyl ether _____ 67.5
Ethyl propyl ether _____ 64
Chloro ethyl methyl ether _____ 59.5
Tertiary butyl ethyl ether _____ 69
Allyl ethyl ether _____ 67.6
Isobutyl methyl ether (at 741 mm) _____ 59
Butyl methyl ether _____ 70
Etc.

In the distillation purification process employing an ether boiling between 55° C. and 70° C., the n-propyl alcohol does not azeotrope with the aliphatic ether nor with the aliphatic ether and water; hence, its effective boiling point remains the same, thus permitting its separation from the other impurities whose boiling points are effectively lowered due to the formation of azeotropes, thus allowing the separation to occur. In carrying out the invention, sufficient ether is added to the crude aqueous n-propyl alcohol mixture to cause its dehydration and its purification due to the formation of azeotropes between the contaminants and the aliphatic ether employed.

This invention is particularly applicable to the recovery of n-propyl alcohol from an aqueous mixture comprising n-propyl alcohol, ethyl alcohol, isopropyl alcohol, paraldehyde, and esters, such as ethyl propionate, n-propyl acetate, isobutyl acetate, ethyl butyrate and secondary butyl acetate. When such a mixture is subjected to fractional distillation in the presence of at least one aliphatic ether boiling in the range of 55° C. to 110° C., and preferably, 55° C. to 70° C., an overhead distillate is produced containing substantially all the ethyl alcohol, all of the isopropyl alcohol, paraldehyde (in the form of acetaldehyde produced by depolymerization) and all the esters. The bottoms resulting from such an azeotropic distillation consist substantially of n-propyl alcohol.

When substantial amounts of the butyl alcohols are present, such as secondary butyl alcohol, n-butyl alcohol, and isobutyl alcohol, and tertiary amyl alcohol, the "n-propyl cut" is first subjected to a water extractive distillation whereby secondary butyl alcohol, isobutyl alcohol, tertiary amyl alcohol and some isopropyl alcohol are distilled overhead. Such a normal propanol cut containing substantial amounts of the butyl alcohols and tertiary amyl alcohol, has the following typical analysis:

| | Weight per cent |
|---|---|
| Water | 30 |
| n-Propanol | 59 |
| Iso-propanol | 4 |
| n-Butanol | 1 |
| Sec-butanol | 3 |
| Iso-butanol | 2 |
| Esters, carbonyls, t-amyl alcohol | 1 |

In the water extractive distillation of such an n-propanol cut, more than 80 mol per cent water, preferably above 84 mol per cent water is employed in the aqueous internal reflux. The aqueous bottoms obtained from the extractive distillation column which contain some n-butyl alcohol is then concentrated by normal fractionation to remove as much water as possible, that is, to bring the water content thereof as close to the azeotropic water composition as is economically possible. The n-propyl alcohol fraction thus freed of secondary butyl alcohol, isobutyl alcohol, tertiary amyl alcohol and some of the isopropyl alcohol is then ready to be fed to the azeotropic distillation column wherein the action of the ether azeotrope-former completes the dehydration and the removal of all the impurities from the n-propyl alcohol except n-butyl alcohol which can then be removed by ordinary fractional distillation.

When an ether boiling in the range of 55° C. to 70° C. is employed, no n-propyl alcohol whatsoever is lost in the form of an azeotrope with the ether. However, in a continuous distillation process, one may employ an ether which is capable of forming an azeotrope with n-propyl alcohol, that is an ether boiling in the range of 70° C. to 110° C., provided one uses such ethers in controlled amounts so as to remove from the "n-propyl alcohol cut" only those contaminants other than n-propyl alcohol, or in amounts such that only a very limited amount of n-propyl alcohol is removed with the ether.

In batch operation, however, the advantage is unique in that employing entrainers within the narrow boiling range of 55° C. to 70° C. none of the n-propyl alcohol whatever is lost overhead during removal of the impurities.

Examples of the higher boiling ethers which may be employed are:

| | Boiling point °C. |
|---|---|
| Amyl methyl ether | 88.5 |
| Butyl methyl ether | 90–93 |
| Allyl ether | 94.3 |
| Propyl ether | 91 |
| Ethyl isobutyl ether | 80 |
| Dichloromethyl ether | 105 |
| Etc. | |

Although all of the ethers boiling in the range of 55° C. to 110° C. are operable under the conditions stated, the unsaturated ethers are not preferred due to their tendency to undergo polymerization. Likewise, the chloroethers are not preferred due to their tendencies to undergo hydrolysis during distillation. The saturated ethers, among those mentioned, are the preferred species according to the terms of this invention.

The invention will be illustrated by the purification of a "n-propyl cut" from which secondary butyl alcohol, isobutyl alcohol and tertiary amyl alcohol have been removed, such as by a water extractive distillation process previously described. The crude n-propyl alcohol feed will then consist of a mixture of ethyl, isopropyl, n-butyl and n-propyl alcohols, paraldehyde, and esters, such as ethyl propionate, n-propyl acetate, secondary butyl acetate, isobutyl acetate and ethyl butyrate. The crude aqueous "n-propyl alcohol cut" of the above composition is led to fractional distillation zone 2 through line 1. An ether of the type described, such as diisopropyl ether, is added to the tower via line 3. Alternatively, the ether entrainer could be added to the crude alcohol cut prior to introduction of the same into the fractionation zone. Sufficient heat is supplied to the fractionation zone, such as by a reboiler later described, so that an overhead distillate is obtained comprising acetaldehyde resulting from depolymerization of the paraldehyde, all of the esters, and all of the alcohols with the exception of n-propyl alcohol and n-butyl alcohol. These impurities present in the distillate will be either in the form of their water azeotropes, of their binary azeotropes with diisopropyl ether, or as their ternary azeotropes with water and diisopropyl ether. The distillate vapors are removed from the fractionation zone via line 4, condensed in condenser 5 and led via line 6 to a settling zone 7. In the settling zone the condensed distillate separates into an upper ether layer and a lower water layer. The condenser is thoroughly mixed before settling. The upper ether layer is refluxed, in whole or in part, via line 8 to fractionation zone 2. Excess ether may be removed from the system via line 17. Esters present in the distillate are more soluble in ether than in water but when present in low concentrations in the feed, they will be continuously removed from the distillate by water. However, the ether layer may be distilled or water-washed for further removal of water-soluble impurities therefrom before it is refluxed to the fractionation zone via line 8 and/or line 3. The lower water layer is led via line 9 to a second fractionation zone 10 wherein the water layer is fractionated for more complete removal of water therefrom. In the fractionation zone 10 the esters, alcohols and acetaldehyde are recovered overhead via line 11 in concentrations at least equal to their water azeotropes. Excess water is removed from the system via line 12. Bottoms consisting substantially of anhydrous n-propyl alcohol and n-butyl alcohol are removed from fractionation zone 2 via line 13. A portion of the bottoms being removed from tower 2 via line 13 may be withdrawn via line 14 into reboiler 15 for heating by indirect or direct heat exchange with a heating medium, such as live steam. This portion of liquid bottoms, heated and partially vaporized in reboiler 15, is recycled via line 16 to the lower part of zone 2 to supply the necessary heat for the distillation thereto. The n-butyl alcohol is readily removed from the n-propyl alcohol by rerunning of the anhydrous bottoms from the tower 2.

Paraldehyde, a unique impurity, has been found in the "n-propyl cut" from the Fischer synthesis product in amounts as high as 5 or 6 weight per cent. It has been found that when especially large concentrations of paraldehyde, such as these, are present in the crude propyl cut, it is advantageous to maintain a pH of 3 or slightly less in the fractionation zone during the distillation to make the decomposition of paraldehyde to the very volatile acetaldehyde more rapid and complete. To this end small concentrations of a substantially non-volatile mineral acid may be added to the distillation zone or to the feed thereto either initially or periodically.

An analysis of the dehydrated n-propyl alcohol bottoms obtained from the above distillation is as follows:

|  | Wt. per cent |
|---|---|
| n-Propyl alcohol (including small amounts of n-butyl alcohol) | 97.3 |
| Water | 1.6 |
| Aldehyde | 0.7 |
| Esters | 0.4 |

The original composition of the feed was:

|  | Wt. per cent |
|---|---|
| n-Propyl alcohol (including ethyl, isopropyl and n-butyl alcohols) | 64.4 |
| Water | 28.9 |
| Esters | 1.3 |
| Aldehyde | 5.4 |

*Example*

Two and a half liters of an "n-propyl alcohol cut" which analyzed as follows:

|  | Wt. per cent |
|---|---|
| n-Propyl alcohol | 63.5 |
| Ethyl alcohol | 0.9 |
| Isopropanol | 0.4 |
| Acid (as acetic) | 0.01 |
| Ester (as ethyl acetate) | 1.2 |
| Aldehyde (as butyraldehyde) | 4.3 |
| Ketone (as MEK) | 0.04 |
| Water | 29.7 |
|  | 100.05 | was fed to a distillation zone with 1500 cc. of diisopropyl ether. The mixture was distilled at a temperature between 60.0° C. and 61.5° C., over a period of approximately 40 hours. During the azeotropic distillation, the aqueous distillate was collected and topped to recover alcohols therefrom. About 4 per cent of ethanol and isopropanol were found in the distillate which corresponds to approximately the ethanol and isopropanol composition of the original feed. No ethanol or isopropanol could be found in the bottoms from the azeotropic distillation zone. These bottoms analyzed as follows:

|  | Wt. per cent |
|---|---|
| n-Propanol | [1] 97.5 |
| Acid (as acetic) | 0.1 |
| Ester (as ethyl acetate) | 0.4 |
| Aldehyde, (as butyraldehyde) | 0.7 |
| Ketone (MEK) | 0.0 |
| Water | 1.7 |

[1] (97.5 to 99.5 wt. per cent).

Although the invention has been described as pertaining to the purification and dehydration of an aqueous crude normal propyl alcohol resulting from the hydrocarbon synthesis operation, it is equally applicable to the preparation and dehydration of crude normal propyl alcohol contaminated by close-boiling oxygenated impurities regardless of its source. For example, the invention is particularly applicable to the crude n-propyl alcohol produced by the reaction between ethylene and carbon monoxide and subsequent hydrogenation of the product in the so-called "oxo" process.

Having described the invention in a manner such that it may be practiced by those skilled in the art, what is claimed is:

1. A process for dehydrating and purifying an aqueous n-propyl alcohol contaminated with ethyl alcohol, isopropyl alcohol and non-alcoholic oxygenated aliphatic compounds whose binary aqueous azeotropes boil in the range of 78.1° C. to 90.4° C., which comprises distilling the contaminated aqueous n-propyl alcohol in a distillation zone in the presence of an aliphatic ether boiling in the range of 55° C. to 110° C., collecting a distillate comprising water, ethyl alcohol, isopropyl alcohol, non-alcoholic oxygenated aliphatic compounds and the aliphatic ether, and recovering substantially pure anhydrous n-propyl alcohol as a distillation residue.

2. A process for dehydrating and purifying an aqueous n-propyl alcohol contaminated with ethyl alcohol, isopropyl alcohol and non-alcoholic oxygenated aliphatic compounds whose binary aqueous azeotropes boil in the range of 78.1° C. to 90.4° C., which comprises distilling the contaminated aqueous n-propyl alcohol in a distillation zone in the presence of an aliphatic ether boiling in the range of 55° C. to 70° C., collecting a distillate comprising water, ethyl alcohol, isopropyl alcohol, non-alcoholic oxygenated aliphatic compounds and the aliphatic ether, and recovering substantially pure anhydrous n-propyl alcohol as a distillation residue.

3. A process according to claim 2 in which the aliphatic ether is diisopropyl ether.

4. A process according to claim 2 in which the ether is tertiary butyl ethyl ether.

5. A process for dehydrating and purifying an aqueous n-propyl alcohol contaminated with ethyl alcohol, isopropyl alcohol and non-alcoholic oxygenated aliphatic compounds whose binary aqueous azeotropes boil in the range of 78.1° C. to 90.4° C., which comprises distilling the contaminated aqueous n-propyl alcohol in a distillation zone in the presence of an aliphatic ether boiling in the range of 70° C. to 110° C., collecting a distillate comprising water, ethyl alcohol, isopropyl alcohol, non-alcoholic oxygenated aliphatic compounds and the aliphatic ether, and recovering substantially pure anhydrous n-propyl alcohol as a distillation residue.

6. A method according to claim 5 in which the aliphatic ether is added in amounts only to form azeotropes with the water, ethyl alcohol, isopropyl alcohol and the non-alcoholic oxygenated compounds.

7. A process for dehydrating and purifying an aqueous n-propyl alcohol contaminated with ethyl alcohol, isopropyl alcohol, n-butyl alcohol and non-alcoholic oxygenated aliphatic compounds whose binary aqueous azeotropes boil in the range of 78.1° C. to 92.3° C., which comprises distilling the contaminated aqueous n-propyl alcohol in a distillation zone in the presence of an aliphatic ether boiling in the range of 55° C. to 110° C., collecting a distillate comprising water, the aliphatic ether, ethyl alcohol, isopropyl alcohol and the non-alcoholic oxygenated aliphatic compounds, recovering substantially anhydrous n-propyl alcohol contaminated with n-butyl alcohol as a distillation residue.

8. A process for dehydrating and purifying an aqueous n-propyl alcohol contaminated with ethyl alcohol, isopropyl alcohol, n-butyl alcohol and non-alcoholic oxygenated aliphatic compounds whose binary aqueous azeotropes boil in the range of 78.1° C. to 92.3° C., which comprises distilling the contaminated aqueous n-propyl alcohol in a distillation zone in the presence of an aliphatic ether boiling in the range of 55° C. to 70° C., collecting a distillate comprising water, the aliphatic ether, ethyl alcohol, isopropyl alcohol and the non-alcoholic oxygenated aliphatic compounds, recovering substantially anhydrous n-propyl alcohol contaminated with n-butyl alcohol as a distillation residue.

9. A process for dehydrating and purifying an aqueous n-propyl alcohol contaminated with ethyl alcohol, isopropyl alcohol, n-butyl alcohol and non-alcoholic oxygenated aliphatic compounds whose binary aqueous azeotropes boil in the range of 78.1° C. to 92.3° C., which comprises distilling the contaminated aqueous n-propyl alcohol in a distillation zone in the presence of an aliphatic ether boiling in the range of 55° C. to 110° C., collecting a distillate comprising water, the aliphatic ether, ethyl alcohol, isopropyl alcohol and the non-alcoholic oxygenated aliphatic compounds, recovering substantially anhydrous n-propyl alcohol contaminated with n-butyl alcohol as a distillation residue and fractionating the distillation residue to separate the n-propyl alcohol from the n-butyl alcohol.

10. A process for dehydrating and purifying an aqueous n-propyl alcohol contaminated with ethyl alcohol, isopropyl alcohol, n-butyl alcohol and non-alcoholic oxygenated aliphatic compounds whose binary aqueous azeotropes boil in the range of 78.1° C. to 92.3° C., which comprises distilling the contaminated aqueous n-propyl in a distillation zone in the presence of an aliphatic ether boiling in the range of 55° C. to 70° C., collecting a distillate comprising water, the aliphatic ether, ethyl alcohol, isopropyl alcohol and the non-alcoholic oxygenated aliphatic compounds, recovering substantially anhydrous n-propyl alcohol contaminated with n-butyl alcohol as a distillation residue and fractionating the distillation residue to separate the n-propyl alcohol from the n-butyl alcohol.

11. A process according to claim 10 in which the aliphatic ether is diisopropyl ether.

12. A process according to claim 10 in which the aliphatic ether is tertiary butyl ethyl ether.

13. A process for dehydrating and purifying an aqueous n-propyl alcohol contaminated with ethyl alcohol, isopropyl alcohol, n-butyl alcohol and non-alcoholic oxygenated aliphatic compounds whose binary aqueous azeotropes boil in the range of 78.1° C. to 92.3° C., which comprises distilling the contaminated aqueous n-propyl alcohol in a distillation zone in the presence of an aliphatic ether boiling in the range of 70° C. to 110° C., collecting a distillate comprising water, the aliphatic ether, ethyl alcohol, isopropyl alcohol and the non-alcoholic oxygenated aliphatic compounds, recovering substantially anhydrous n-propyl alcohol contaminated with n-butyl alcohol as a distillation residue and fractionating the distillation residue to separate the n-propyl alcohol from the n-butyl alcohol.

14. A method according to claim 13 in which the aliphatic ether is added in amounts only to form azeotropes with the water, ethyl alcohol, isopropyl alcohol and the non-alcoholic oxygenated aliphatic compounds.

15. A process for dehydrating and purifying an aqueous n-propyl alcohol contaminated with ethyl alcohol, isopropyl alcohol and non-alcoholic oxygenated aliphatic compounds whose binary aqueous azeotropes boil in the range of 78.1° C. to 90.4° C., which comprises distilling the contaminated aqueous n-propyl alcohol in a distillation zone in the presence of an aliphatic ether boiling in the range of 55° C. to 70° C., collecting a distillate comprising water, the aliphatic ether, ethyl alcohol, isopropyl alcohol and the non-alcoholic oxygenated aliphatic compounds, condensing the distillate whereby an ether-rich phase and a water-rich phase are formed, returning the ether-rich phase to the distillation zone, and recovering substantially pure anhydrous n-propyl alcohol as a distillation residue.

16. A process according to claim 15 in which the aliphatic ether is diisopropyl ether.

17. A process according to claim 15 in which the aliphatic ether is tertiary butyl ethyl ether.

CARL S. CARLSON.
NAT C. ROBERTSON.
CARTER E. PORTER.

REFERENCES CITED

The following references are of record in the file of this patent:

UNITED STATES PATENTS

| Number | Name | Date |
|---|---|---|
| 1,422,583 | Lebo | July 11, 1922 |
| 1,568,349 | Steffens | Jan. 5, 1926 |
| 1,831,425 | Ricard | Nov. 10, 1931 |
| 1,862,706 | Ricard et al. | June 14, 1932 |
| 2,140,694 | Evans | Dec. 20, 1938 |
| 2,392,534 | Von Keussler | Jan. 8, 1946 |